US011058060B2

(12) United States Patent
Barnett et al.

(10) Patent No.: US 11,058,060 B2
(45) Date of Patent: Jul. 13, 2021

(54) DRIVE TRANSFER MEMBER FOR OPERABLY COUPLING A DRAPER HEADER TO A HARVESTING MACHINE

(71) Applicant: MacDon Industries Ltd., Winnipeg (CA)

(72) Inventors: Neil Barnett, Waunakee, WI (US); Scott Dietsche, Sun Prairie, WI (US)

(73) Assignee: MacDon Industries Ltd., Winnipeg (CA)

( * ) Notice: Subject to any disclaimer, the term of this patent is extended or adjusted under 35 U.S.C. 154(b) by 146 days.

(21) Appl. No.: 16/366,282

(22) Filed: Mar. 27, 2019

(65) Prior Publication Data

US 2019/0216017 A1    Jul. 18, 2019

Related U.S. Application Data

(62) Division of application No. 15/642,526, filed on Jul. 6, 2017, now Pat. No. 10,349,580.

(51) Int. Cl.
| | |
|---|---|
| *A01D 61/02* | (2006.01) |
| *A01D 69/03* | (2006.01) |
| *A01D 61/00* | (2006.01) |
| A01D 41/02 | (2006.01) |
| A01D 41/06 | (2006.01) |
| A01D 41/14 | (2006.01) |

(Continued)

(52) U.S. Cl.
CPC .......... *A01D 61/02* (2013.01); *A01D 61/004* (2013.01); *A01D 61/008* (2013.01); *A01D 69/03* (2013.01); *A01D 34/04* (2013.01); *A01D 41/02* (2013.01); *A01D 41/06* (2013.01); *A01D 41/142* (2013.01); *A01D 69/06* (2013.01)

(58) Field of Classification Search
CPC ...... A01D 61/02; A01D 69/03; A01D 61/004; A01D 61/008; A01D 69/06; A01D 41/02; A01D 41/06; A01D 41/142; A01D 34/04; A01D 57/20; A01D 41/16; A01D 41/14; A01D 69/00; A01D 61/002; A01D 43/06; A01D 61/006; A01F 29/14
See application file for complete search history.

(56) References Cited

U.S. PATENT DOCUMENTS

| | | | | |
|---|---|---|---|---|
| 3,244,271 A | * | 4/1966 | Wenning | A01D 61/004 198/669 |
| 3,732,740 A | * | 5/1973 | Fell | A01D 69/06 74/15.2 |

(Continued)

*Primary Examiner* — Arpad Fabian-Kovacs
(74) *Attorney, Agent, or Firm* — Miller Canfield

(57) ABSTRACT

A draper header is attached to a harvesting machine by an adapter including a bottom feed draper and an upper feed roller driven by a coupling from an output of the machine rotatable about an axis parallel to the forward direction and a right angle gearbox. The feed roller is mounted at each end allowing independent up and down floating movement of the ends and there is provided a mechanical linkage using two chains and an idler shaft between the output shaft of the gear box an input shaft of the roller with a universal coupling therebetween. The gear box is located at least partly underneath the discharge opening and underneath the feed roller, rearwardly of the rear guide roller of the feed draper, rearwardly of the axis of rotation of the feed roller and underneath a feed pan which is inclined upwardly and rearwardly over the gear box.

18 Claims, 6 Drawing Sheets

(51) Int. Cl.
*A01D 34/04* (2006.01)
*A01D 69/06* (2006.01)

(56) References Cited

U.S. PATENT DOCUMENTS

| | | | | |
|---|---|---|---|---|
| 4,956,966 A * | 9/1990 | Patterson | ............... | A01D 41/14 56/181 |
| 5,527,218 A * | 6/1996 | Van den Bossche | ........................ | A01D 41/142 460/116 |
| 6,735,929 B2 * | 5/2004 | Watts | ..................... | A01B 71/06 56/14.9 |
| 6,865,871 B2 * | 3/2005 | Patterson | ............... | A01D 57/20 56/14.5 |
| 7,213,389 B2 * | 5/2007 | Teijido | ............... | A01D 41/1274 56/10.8 |
| 7,444,798 B2 * | 11/2008 | Patterson | ............... | A01D 41/14 56/181 |
| 7,470,180 B2 * | 12/2008 | Honey | ................... | A01D 41/16 460/105 |
| 7,587,885 B2 * | 9/2009 | Tippery | ................. | A01D 57/20 56/14.5 |
| 7,802,417 B2 * | 9/2010 | Sauerwein | ............. | A01D 43/06 56/181 |
| 7,921,627 B2 * | 4/2011 | Sauerwein | ............. | A01D 34/14 56/181 |
| 8,631,634 B2 * | 1/2014 | Vereecke | ............... | A01D 41/16 56/14.9 |
| 8,973,344 B2 * | 3/2015 | Ritter | ................... | A01B 71/063 56/15.3 |
| 9,043,954 B2 * | 6/2015 | Ritter | ................... | A01B 71/063 |
| 9,198,352 B2 * | 12/2015 | Tilly | .................... | A01D 45/021 |
| 2002/0129591 A1 * | 9/2002 | Patterson | ............... | A01D 57/20 56/158 |
| 2003/0109292 A1 * | 6/2003 | Schroeder | ............ | A01D 41/142 460/16 |
| 2004/0014510 A1 * | 1/2004 | Schroeder | ............ | A01D 41/142 460/2 |
| 2004/0060271 A1 * | 4/2004 | Ameye | ................ | A01D 41/142 56/10.8 |
| 2004/0148919 A1 * | 8/2004 | Dunn | .................... | A01D 57/20 56/16.4 R |
| 2004/0163374 A1 * | 8/2004 | Rickert | ................. | A01D 69/00 56/16.4 R |
| 2004/0187461 A1 * | 9/2004 | Rickert | ................. | B60K 25/06 56/14.2 |
| 2005/0284124 A1 * | 12/2005 | Patterson | ............. | A01D 61/006 56/364 |
| 2007/0261379 A1 * | 11/2007 | Johnson | ............... | A01D 41/142 56/11.2 |
| 2008/0006014 A1 * | 1/2008 | Guske | ................... | A01D 41/16 56/15.6 |
| 2008/0098705 A1 * | 5/2008 | Salley | .................... | A01D 41/06 56/16.4 R |
| 2008/0256914 A1 * | 10/2008 | Ricketts | ............... | A01B 71/063 56/10.8 |
| 2010/0011727 A1 * | 1/2010 | Rauschenbach | ........ | A01F 29/14 56/11.8 |
| 2015/0195992 A1 * | 7/2015 | Corum | ................... | A01D 57/20 198/498 |

* cited by examiner

DRIVE TRANSFER MEMBER FOR OPERABLY COUPLING A DRAPER HEADER TO A HARVESTING MACHINE

FIELD OF THE INVENTION

This application is a divisional application from application Ser. No. 15/642,526 filed Jul. 6 2017.

The present invention relates to a draper header arranged for mounting on a self-propelled harvesting machine and particularly to drive arrangements which provide to various components of the machine. The header is particularly applicable to a forage harvester but can be used on any harvesting machine including combines.

BACKGROUND

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar. A feed draper can be provided forming a continuous loop of flexible material wrapped around rollers so as to define a front of the draper adjacent the cutter bar, a rear of the draper spaced rearwardly of the cutter bar and an upper run of the draper on top of the rollers for carrying the crop rearwardly to a discharge opening of the header for feeding into a feeder house of the harvester.

The draper header of this type includes two side drapers each running from an outer end guide roller at an outer end of the header to an inner end guide roller adjacent a discharge location of the header which is registered and communicated with a feeder house of an agricultural crop harvesting machine supporting the header. There is also a central feed draper located at the discharge location and including a front guide roller just behind the cutter bar and running to a rear guide roller at the feeder house of the crop harvesting machine. As such, there are two side drapers to transport the crop cut by the knife inwardly along the header to a central discharge opening. The side drapers discharge onto the central feed draper so as to carry the crop from the side drapers rearwardly into the feeder house for inlet into the crop harvesting machine for processing. A rotary feed roller which typically carries flight portions is mounted at the discharge opening of the header above the feed draper so as to assist in carrying bulky crop through the discharge opening so as to be carried into the feeder house. A front edge of the flight is presented forward of the rear end of the feed draper and feeds the material inwardly and underneath the rotary feed member to the inlet of the feeder house.

The draper header of this type can be used for attachment to a swather tractor for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

Presently, draper headers have not been purposely designed to be used with self-propelled forage harvesters. Adaptations have been made to headers designed for combine harvesters to enable use on a forage harvester though these adaptations were primarily concerned with issues including mounting locations, and connectors and connections for hydraulic fluid delivery to the header. For example, the company RCI Engineering LLC makes commercially available conversion bundles so as to render usable a draper header on John Deere forage harvesters such as the 7000 series, and 7250 through 7750 series. Traditionally, these harvesting machines have power units providing a header drive similar to that of a combine harvester, that is coupling to the header occurs in the longitudinal direction of the header (laterally transverse to the forward working and travel direction). Thus, modifications to mounting and hydraulics connection of the header to the harvester were enough to render the draper header operable on the forage harvester.

More recently, many forage harvesters are produced with a header drive which runs and couples in a direction parallel to the forward working/travel direction, which for example allows for easier implementation of automatic driveshaft coupling systems. However, it is now more difficult to adapt a draper header designed for a combine harvester for use with a forage harvester because the primary mechanical power input to headers of this type is parallel to the length of the header, that is parallel to the longitudinal direction of the header.

SUMMARY OF THE INVENTION

According to one aspect of the invention there is provided a harvesting header for attachment to a self-propelled harvesting machine;

where the harvesting machine has a feed opening at a forward end and a drive shaft at or adjacent the feed opening for transmitting power to the harvesting header, the drive shaft extending in a plane generally parallel to a forward travel direction of the harvesting machine and including an output coupling member at a forward end thereof;

the harvesting header being arranged for cutting and transporting a standing crop and comprising:

a header frame;

an elongate cutter connected to the frame at a forward end thereof so as to be arranged along a front edge of the header frame;

a draper assembly for carrying the crop when cut to a discharge opening of the header;

the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;

a feed roller member mounted at the discharge opening and arranged to be driven in rotation in a direction to carry crop underneath the feed roller member through the discharge opening into the feed input opening of the harvesting machine;

a header power input coupling rotatable about an axis in said plane parallel to the forward direction for receiving power from the header drive coupling of the harvesting machine and for driving from the power at least the feed roller member and the draper assembly;

and a drive system including a gear box connected to the input coupling and providing an output shaft for driving at least the feed roller member where the output shaft extends transversely to the forward direction.

The term feed roller member includes any generally cylindrical member which may or may not include a cylindrical wall and will typically include auger flights on part or all of the periphery but these are not essential. In some cases fingers may be provided which can be retractable at different angular positions of the roller. That is the specific construction of the rotatable member forming the roller member can vary but in general the member forms some form of outer peripheral construction which engages the crop to carry it underneath the axis of rotation of the member.

As set forth above, the output shaft drives at least the feed roller member but also typically will drive some or all of the remaining components of the header including the cutter bar and the drapers. That is preferably the output shaft also drives a hydraulic pump for at least driving the cutter and the drapers.

Preferably the drive system comprises a right angle gearbox.

Preferably the right angle gearbox is mounted at least partially within an imaginary downward projection of the feed roller.

According to a second aspect of the invention there is provided a crop harvesting header for attachment to a self-propelled harvesting machine;

the header being arranged for cutting and transporting a standing crop and comprising:

a header frame;

an elongate cutter connected to the frame at a forward end thereof so as to be arranged along a front edge of the header frame;

a draper assembly for carrying the crop when cut to a discharge opening of the header;

the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;

a feed roller member mounted at the discharge opening and arranged to be driven in rotation in a direction to carry crop underneath the feed roller member through the discharge opening into the feed input opening of the harvesting machine;

wherein the feed roller is mounted at each end on supports allowing independent up and down floating movement of the ends of the feed roller member;

an output drive shaft for providing drive at least to the feed roller member of the harvesting machine and a mechanical linkage between the output shaft and an input drive shaft connected to one end of the feed roller member;

and wherein there is provided a universal coupling between the input drive shaft and said one end of the feed roller member to allow raising and lowering of said end relative to the other end.

Preferably the universal coupling is located within an end portion of the roller.

Preferably the universal coupling is connected to a transverse plate within the roller.

In a preferred arrangement, the adapter includes a feed draper including a front guide roller located rearward of the cutter bar, a rear guide roller behind the front guide roller, and a draper canvas wrapped around the front and rear guide rollers to define a top run of the feed draper for receiving the crop material from the discharge ends of the first and second side drapers and for carrying the crop material rearwardly towards the discharge opening. However in other cases the feed draper can be omitted so that the crop is carried into the discharge opening by the feed roller.

More specifically the gearbox is preferably positioned behind the rear guide roller of the feed draper and also the gearbox is preferably positioned rearwardly of the axis of rotation of the feed roller.

Preferably at the rear of the feed draper is provided a crop guide surface which is located over the gearbox and arranged to direct the crop to the feed opening where the guide surface is inclined upwardly and rearwardly from the forward edge just behind the feed draper to a rearward edge at the feed opening of the feeder house of the forage harvester.

Preferably the adapter includes a bottom pan underneath the feed draper defining a bottom plane which extends from the cutter bar along the underside of the header frame to a position forward of the feeder house. In this arrangement the gearbox is preferably arranged behind the bottom pan and above the plane of the pan. In this way the gearbox is located in a protected location where it is retracted behind the pan and above the position where it can engage the ground.

In accordance with another important preferable feature of the invention there is provided a mechanical linkage between the output shaft and an input drive shaft connected to one end of the feed roller.

Preferably the mechanical linkage comprises an idler shaft parallel to the output shaft and the input drive shaft, a first chain and sprocket drive located between the output shaft and the idler shaft and a second chain and sprocket drive between the idler shaft and the input drive shaft.

This is typically used in arrangement in which the feed roller is mounted at each end on supports allowing up and down floating movement of the feed roller.

In one example the supports can comprise pivot arms for pivotal movement about a transverse axis longitudinal of the cutter bar. The location of the pivot is preferably in front of the roller but can be located at other positions.

Where the mechanical linkage includes the above idler shaft parallel to the output shaft and the input drive shaft, preferably the pivot arms have a pivot axis coaxial with the idler shaft.

Also it is preferable that each pivot arm is associated with a spring acting to bias the feed roller downwardly.

In addition to driving the feed roller, also the output shaft is preferably connected to a hydraulic pump to provide a hydraulic fluid drive to the drapers and two other components on the header including the knife drive and reel.

According to another important preferred feature of the invention, where the feed roller is mounted at each end on supports allowing independent up and down floating movement of the ends of the feed roller and there is provided a mechanical linkage between the output shaft and an input drive shaft connected to one end of the feed roller, preferably there is provided a universal coupling between the input drive shaft and said one end of the roller to allow raising and lowering of that end relative to the other end.

Preferably universal coupling is located within an end portion of the roller and connected to a transverse plate within the roller.

According to another aspect of the invention there is provided a crop harvesting header crop harvesting header for attachment to a self-propelled forage harvester;

where the forage harvester has a feed input opening at a forward end and a drive shaft at or adjacent the feed opening for transmitting power to the crop harvesting header, the header drive shaft extending in a plane generally parallel to a forward travel direction of the forage harvester and including an output coupling member at a forward end thereof;

the header being arranged for cutting and transporting a standing crop and comprising:

a header frame;

an elongate cutter bar connected to the frame at a forward end thereof so as to be arranged along a front edge of the header frame;

a draper assembly for carrying the crop when cut to a discharge opening of the header;

the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;

an adapter comprising:

an adapter frame arranged for attaching to the forage harvester at the feed opening and to the header frame so that the header frame is supported by the forage harvester;

a feed roller mounted at the discharge opening and arranged to be driven in rotation in a direction to carry crop underneath the feed roller through the discharge opening into the feed input opening of the forage harvester;

a header power input coupling rotatable about an axis in said plane parallel to the forward direction for receiving power from the header drive coupling of the forage harvester and for driving from the power the feed roller and the draper assembly;

and a right angle gearbox at the header power input coupling including an output shaft rotating about an axis at right angles to the forward direction and longitudinally of the cutter bar;

wherein there is provided a mechanical linkage between the output shaft and an input drive shaft connected to one end of the feed roller.

Preferably the mechanical linkage comprises an idler shaft parallel to the output shaft and the input drive shaft, a first chain and sprocket drive located between the output shaft and the idler shaft and a second chain and sprocket drive between the idler shaft and the input drive shaft.

Preferably the feed roller is mounted at each end on supports allowing up and down floating movement of the feed roller.

Preferably the supports comprise pivot arms for pivotal movement about a transverse axis longitudinal of the cutter bar.

Preferably there is provided an idler shaft parallel to the output shaft and the input drive shaft, a first chain and sprocket drive located between the output shaft and the idler shaft and a second chain and sprocket drive between the idler shaft and the input drive shaft and wherein the pivot arms have a pivot axis coaxial with the idler shaft.

Preferably each pivot arm is associated with a spring acting to bias the feed roller downwardly.

According to another aspect of the invention there is provided a crop harvesting header crop harvesting header for attachment to a self-propelled forage harvester;

where the forage harvester has a feed input opening at a forward end and a drive shaft at or adjacent the feed opening for transmitting power to the crop harvesting header, the header drive shaft extending in a plane generally parallel to a forward travel direction of the forage harvester and including an output coupling member at a forward end thereof;

the header being arranged for cutting and transporting a standing crop and comprising:

a header frame;

an elongate cutter bar connected to the frame at a forward end thereof so as to be arranged along a front edge of the header frame;

a draper assembly for carrying the crop when cut to a discharge opening of the header;

the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;

an adapter comprising:

an adapter frame arranged for attaching to the forage harvester at the feed opening and to the header frame so that the header frame is supported by the forage harvester;

a feed roller mounted at the discharge opening and arranged to be driven in rotation in a direction to carry crop underneath the feed roller through the discharge opening into the feed input opening of the forage harvester;

a header power input coupling rotatable about an axis in said plane parallel to the forward direction for receiving power from the header drive coupling of the forage harvester and for driving from the power the feed roller and the draper assembly;

and a right angle gearbox at the header power input coupling including an output shaft rotating about an axis at right angles to the forward direction and longitudinally of the cutter bar;

wherein the feed roller is mounted at each end on supports allowing independent up and down floating movement of the ends of the feed roller;

wherein there is provided a mechanical linkage between the output shaft and an input drive shaft connected to one end of the feed roller;

and wherein there is provided a universal coupling between the input drive shaft and said one end of the roller to allow raising and lowering of said end relative to the other end.

Preferably universal coupling is located within an end portion of the roller and connected to a transverse plate within the roller.

It is an aspect of the invention to provide a gearbox for a crop harvesting draper header to be used with a self-propelled forage harvester. The self-propelled forage harvester has a header drive for transmitting power to the header that is configured for connecting in a coupling direction parallel to a forward travel direction of the forage harvester. Thus, the gearbox is arranged to operatively couple an output coupling of the forage harvester's header drive and an input coupling of a header power input for receiving the power from the forage harvester so that transmission of power from the forage harvester to the header is enabled.

Typically the input coupling of the header power input is configured for coupling in a longitudinal direction of the header which is transverse to the forward direction of travel of the harvester. As such, the gearbox allows couplings that have incompatible coupling directions to be operatively connected together.

Thus, arrangement described herein operatively couples the header drive on the forage harvester to the input on the header.

Furthermore, presently known and commercially available designs of draper headers provide very little clearance thereunder because their components including the draper are already positioned for optimal performance and feeding into the feeder house of the harvester. Additionally, it is desirable to position the header as close as possible to the harvester to reduce the overhung load on the harvesting machine and so as to reduce need for additional feeding devices to feed crop rearwardly into the machine if there is too large a gap therebetween.

Moreover, in such an arrangement, it is desirable that a drive mechanism driving the rotary feed member accommodates for a difference in speed between the main drive input to the header and the rotary member to achieve a proper ratio between intake roll speed (which determines length of chop) and header speed.

Yet further, it is known that non-uniform amounts of cut crop can pass under the rotary member across its length, which is why the rotary member is typically arranged to float over a feed pan thereunder. As the rotary feed member floats it remains connected to the drive mechanism so as to be driven thereby.

BRIEF DESCRIPTION OF THE DRAWINGS

An embodiment of the invention will now be described in conjunction with the accompanying drawings in which.

In the drawings like characters of reference indicate corresponding parts in the different figures.

DETAILED DESCRIPTION

Figure 1:
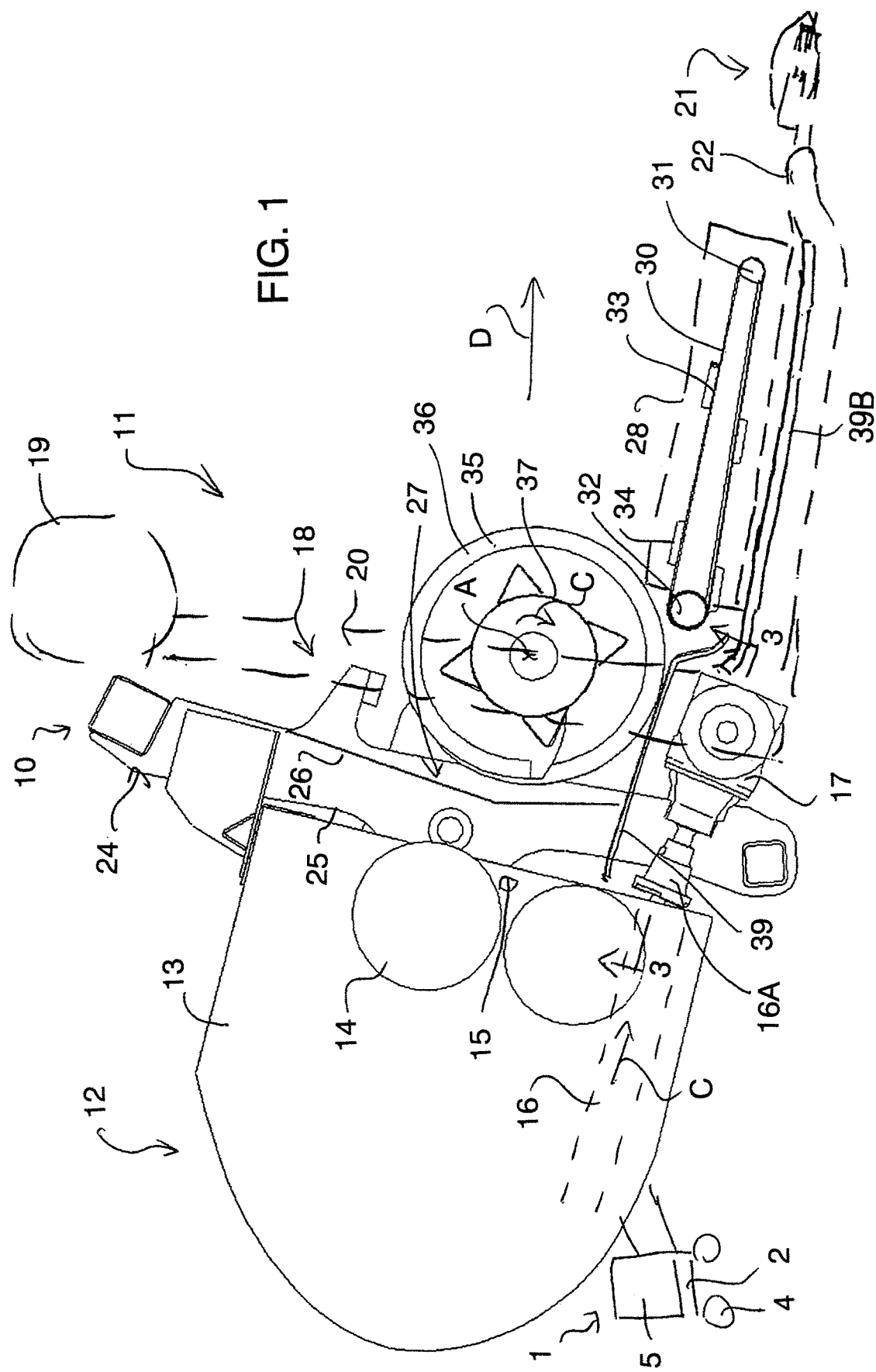
FIG. 1 is a cross sectional view showing schematically a central section only of a header according to the present invention.
Figure 2:
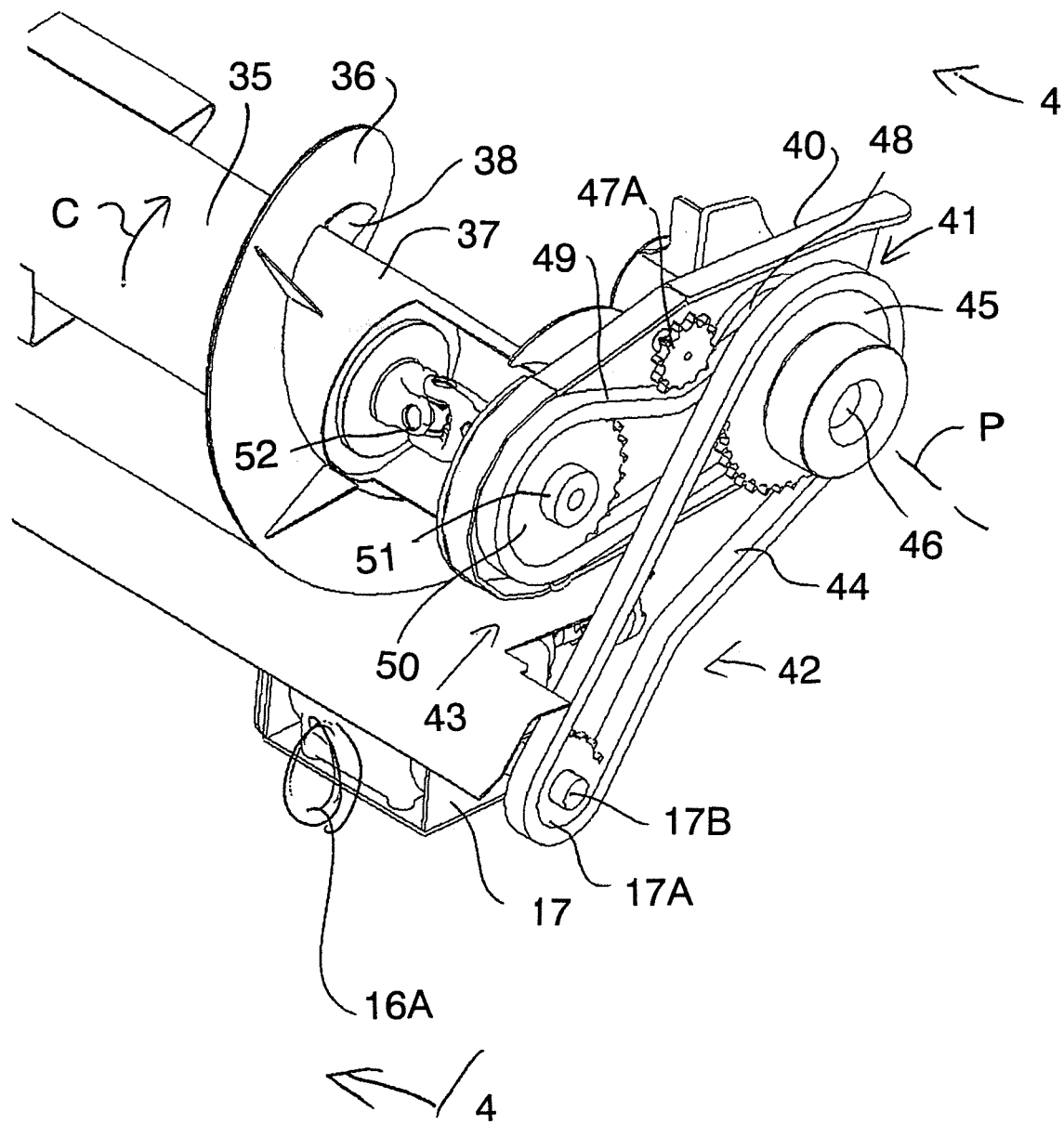
FIG. 2 is an isometric view showing only a portion of the central section of the header of FIG. 1.

There is illustrated in the accompanying figures an adapter 10 for a crop harvesting header 11 that is to be used for example on a self-propelled forage harvester 12. The forage harvester 12 shown only schematically includes a feeder house 13 with a forwardly facing open mount 15 at which is located a feed roll system 14 to carry cut crop from the harvesting header 11.

Typically self-propelled forage harvesters have a header drive 16 for transmitting power to the crop harvesting header that is configured for connecting in a coupling direction C which is parallel to a forward travel direction D. In order to make this drive 16 compatible for connecting to a header power input of the adapter of the header, there is provided a right angle gearbox 17 providing a perpendicularly transverse connection therebetween.

Since the present invention is concerned with an arrangement providing transmission of power from the harvester to the header, certain details which are not pertinent to this topic may be omitted herein as they are otherwise known to a person skilled in the art concerning agricultural crop headers and harvesting machines.

The conventional self-propelled forage harvester 1, also termed forager, is well known in the art and generally comprises a frame 2 rollably supported for movement on the ground by wheels 4, a cab 5 for housing an operator with controls for operating the forager including steering, and the feeder house 13 at a forward end of the frame that defines an inlet to internal processing elements of the forager (not shown) that convert cut crop fed into the feeder house into forage dischargeable from an outlet of the forager into a storage vehicle moving with the forage harvester during the foraging process.

The feeder house 13 of the forager 1 may receive at its forward end a crop harvesting header for cutting a standing crop as the forager moves in a forward working direction across the ground supporting the crop.

A conventional draper header 11 includes a header frame 18 comprising a main rear frame member 19 extending longitudinally of the header (which is a transverse direction relative to the forward travel direction of the forage harvester) with a plurality of forwardly extending beams 20 each supported by the main rear frame member 19. An elongate cutter bar 21 is connected to a forward end 22 of the beams so as to be arranged along a front edge of the header frame 18.

An adapter 10 is provided to connect the draper header, such as that typically used on a combine harvester, on the forage harvester. The adapter 10 of the illustrated embodiment thus comprises a frame 24 which is attachable at a rear side 25 thereof to the feeder house 13 at its forward end and at an opposite front side 26 to the crop header 11 at a central discharge location 27 to which a side draper 28, 29 (FIG. 6) on either side thereof carries cut crop.

The side drapers 28 and 29 form a draper assembly which is mounted on the header frame 20 rearwardly of the cutter bar 21 such that crop cut by the cutter bar falls onto the draper assembly for transportation longitudinally of the header to the central discharge location for communication with a feed opening 27 defined by the feeder house 13 of the forage harvester. Each side draper 28, 29 includes an outer guide roller adjacent an outer end of the header frame, so that the outer guide rollers of the side drapers are at opposite ends of the header frame 20, and an inner guide roller adjacent the feed opening 27 with a flexible loop of material wrapped about the pair of co-acting guide rollers so as to define a top run of the respective side draper on which the cut crop is carried across the header to a discharge end of the respective side draper adjacent the feed opening 27. The top run of the respective side draper is supported for example by a conventional skid plate (not shown) mounted on the header frame so as to prevent sagging under weight of the cut crop.

Further details of the crop draper header are not described (nor illustrated) herein as they will be apparent to a person skilled in the art.

The adapter 10 further includes a feed draper 30 which cooperates with the side drapers 28, 29 of the header 11 to deliver the cut crop to the forage harvester. The feed draper 30 is located with a front roller adjacent the cutter bar 21 and a rear roller adjacent the discharge opening 27 so as to carry the cut crop from the side drapers to the discharge opening. Thus the feed draper includes a front guide roller 31 located rearwardly of the cutter bar 21, a rear guide roller 32 in spaced relation behind the front guide roller, and a flexible loop of material 33 substantially the same as that used on the side drapers that is wrapped around the front and rear guide rollers to define a top run of the feed draper for receiving the crop material from the discharge ends of the first and second side drapers 28, 29 and for carrying the crop material rearwardly towards the feed opening 27 of the forage harvester. The feed draper canvas 33 typically includes slats 34 arranged to form a V-shape across a width of the feed draper from the discharge end of one side draper to the other, as is conventional in feed drapers.

To assist with transfer of the cut crop material to the forager feeder house 13 is provided a feed roller 35 which is mounted rearwardly of the front guide roller 31 of the feed draper. The feed roller 35 includes a pair of helical flight portions 36 wrapping around a tube 37 having an axis A of the roller with the flight portions being located at the ends only of the roller and wrapped in opposite directions so that the feed roller mounted for rotation in a clockwise direction C around the axis A tends to bring the cut crop centrally of the feeder house opening 27. Each of the helical flights 36 may be reinforced with gusset plates 38 coupled between same and the tube 37 of the feed roller. Extending underneath the feed roller 35 rearwardly towards the feed opening 27 is a feed pan 39 across which the cut crop is conveyed on its path to the feeder house opening 15. It will be appreciated that the feed roller 35 is arranged to float at various heights over the feed pan 39 so as to accommodate different amounts of cut crop passing thereunder, as well as to float upwardly at each end independently so as to assume non-uniform height across the adapter when a distribution of the cut crop passing under the feed roller is non-uniform.

The feed roller 35 is supported in rotation by a pair of support arms 40 each at a respective end each extending forwardly from a mounting location 41 on the adapter frame spaced above and rearwardly of the rear guide roller 32 of the feed draper and rearwardly of the axis A of the feed roller. These support arms 40 are pivotal about a pivot axis P located at the mounting location and oriented across the adapter, so as to be parallel to rotation axis A of the feed roller. Thus by pivoting of the support arm the feed roller is allowed to float at a height over the feed pan based on the thickness of the cut crop passing under the roller. Each pivot arm 40 is associated with a spring 40A acting to bias the feed roller downwardly or to float the roller.

In order to drive the feed roller 35 and the feed draper 30 of the adapter, and the cutter bar and draper assembly of the header, there is provided at the header power input for receiving the power from the header drive 16 of the forage harvester the gearbox 17 for operatively coupling to an output coupling 16A of the forager's header drive 16 at a right angle so as to transmit power from the forager to drive such peripheral components as, for example, on the adapter and the header.

The gearbox 17 comprises a conventional right angle gear box so that the input coupling and the output shaft 17B can be linked at a 90 degree angle by interconnecting bevel gears 17C and 17D. This gearbox has an input shaft 17E which is positioned in line with the output coupling 16A of the drive 16.

The gearbox 17 is positioned rearwardly of the feed draper 30 and rearwardly of the mounting location/pivot axis P of the support arms 40, beneath the feed roller 35 and the feed pan 39, and no further forwardly than the rotation axis A of the feed roller so that the header 11 can be located in close relation to the forager. Furthermore, and more specifically, the gearbox 17 is positioned lower than the rear guide roller 32 of the feed draper. With such a placement of the gearbox, clearances between each pairing of the feed draper and feed roller, and the feed roller and intake conditioning rollers 13 of the forager in the feeder house 7, can be optimized for proper material transfer within the pairing. In the illustrated embodiment the gearbox 17 is located at one end of the feed roller 35, in this specific case a left end.

For driving the feed roller 35 there is provided on the gearbox 17 the output shaft 17B extending that is operatively coupled to the feed roller 35 via two drive stages 42, 43 so that this drive system can accommodate floating of the feed roller wherein the rotation axis A of the feed roller is not fixed in location nor in relation to the gearbox. The output shaft 17B extends from the gearbox towards the outer end of the header 11. The output shaft 17B supports a sprocket 17A about which an endless chain 44 is wrapped and extends to a larger sprocket 45 supported on an intermediary shaft 46 mounted forwardly of the output shaft 17B at the mounting location of the supports arms 40 for rotation about a longitudinal axis P. The intermediary shaft 46 extends beyond the pivotal support arm located generally at that common end of the feed roller where the gearbox 17 is located. In the illustrated embodiment the longitudinal rotation axis of the intermediary shaft 46 is coaxial with the pivot axis P of the support arms which are pivotal such that the intermediate shaft 46 is also above the output shaft 17B. This forms a first one 42 of the drive stages for driving the feed roller 35. A guide sprocket 47 is provided at a bottom run of the loop intermediate the end sprockets 17A, 45 so as to guide and tension the endless chain in a path.

A second one 43 of the drive stages is formed by a second sprocket 48 supported on the intermediary shaft 46 and connected by an endless chain 49 to a sprocket 50 located rearwardly of the intermediary shaft 46 and connected to the feed roller 35. The second sprocket 48 on the intermediary shaft 46 is located thereon to one side of the first intermediary sprocket 45 in a direction towards center of the header, such that the second intermediary sprocket 48 is closer to the pivotal support arm 40 nearest the first drive stage. A guide sprocket 47A is provided intermediate the roller sprocket 50 and the second intermediary sprocket 48 at a top run of the loop so as to guide the endless chain 49 in a path in which it is maintained wrapped around these two sprockets 48, 50 as the pivotal support arm moves wherein the roller rotation axis A changes location relative to the intermediary shaft 46. Thus the second drive stage 43 is carried alongside the pivotal support arm and is adapted to move therewith in pivotal movement of the support arm. This saves axial space in the longitudinal direction of the adapter.

The first drive stage 42 is configured to change rotational speed of the output shaft of the gearbox to a prescribed speed for the rotation of the feed roller.

Where the feed roller is driven there is provided a universal joint 52 carried on the shaft 51 of the sprocket 50 allowing the axis of rotation A of the feed roller 117 to be inclined relative to the axis of the shaft 51 such that the floating height of the feed roller is non-uniform across the feed pan 39. The universal joint 52 is located adjacent that end of the feed roller where it is mechanically driven via the gearbox 17, that is adjacent the left-hand pivotal support arm carrying the second drive stage, and such that the universal joint and the gearbox are located closer to a common end of the feed roller than to the other. This allows the feed roller to be driven while being biased in a position against the cut crop passing underneath it when, in some instances, an amount of the cut crop across the central discharge location can be non-uniform causing one end of the feed roller to be raised relative to the other end.

The universal joint 52 is of a conventional commercially available construction with a first member 52A attached in fixed relation to the shaft 51 supporting the roller sprocket 50 and a second member of the universal joint connected to a plate 54 attached across the inside of the tube 37.

Thus the universal joint 52 is located intermediate opposite ends 35A and 35B of the feed roller, and that one of the helical flights 36 generally on the common end of the feed roller as the universal joint wraps about the axis A of the feed roller.

Thus the right angle gearbox 17 is mounted at least partly underneath the discharge opening 27 and underneath the feed roller 35. The gearbox 17 is positioned behind the rear guide roller 32 of the feed draper 30. The gearbox is positioned rearwardly of the axis A of rotation of the feed roller 35. The pan 39 defines a crop guide surface which is located over the gearbox 17 and arranged to direct the crop to the feed opening. The guide surface defined by the pan 39 is inclined upwardly and rearwardly. A front edge 39A of the pan 39 cooperates with a rear edge of a bottom pan 39B defining a bottom plane and wherein the gearbox is arranged behind the bottom pan 39B of the adapter underneath the feed draper 30. As shown in FIG. 1, the bottom pan 39B extends from a position at the cutter bar rearwardly and defines a bottom plane of the adapter. The bottom of the gear box 17 is located at or adjacent the plane of the pane 39B.

The mechanical linkage defined by the drive trains 42 and 43 comprises the idler shaft 46 parallel to the output shaft 17B and the input drive shaft 51 to the roller. The first chain and sprocket drive 42 is located between the output shaft 17B and the idler shaft 46 and the second chain and sprocket drive 43 is located between the idler shaft 46 and the input drive shaft 51.

Figure 3:
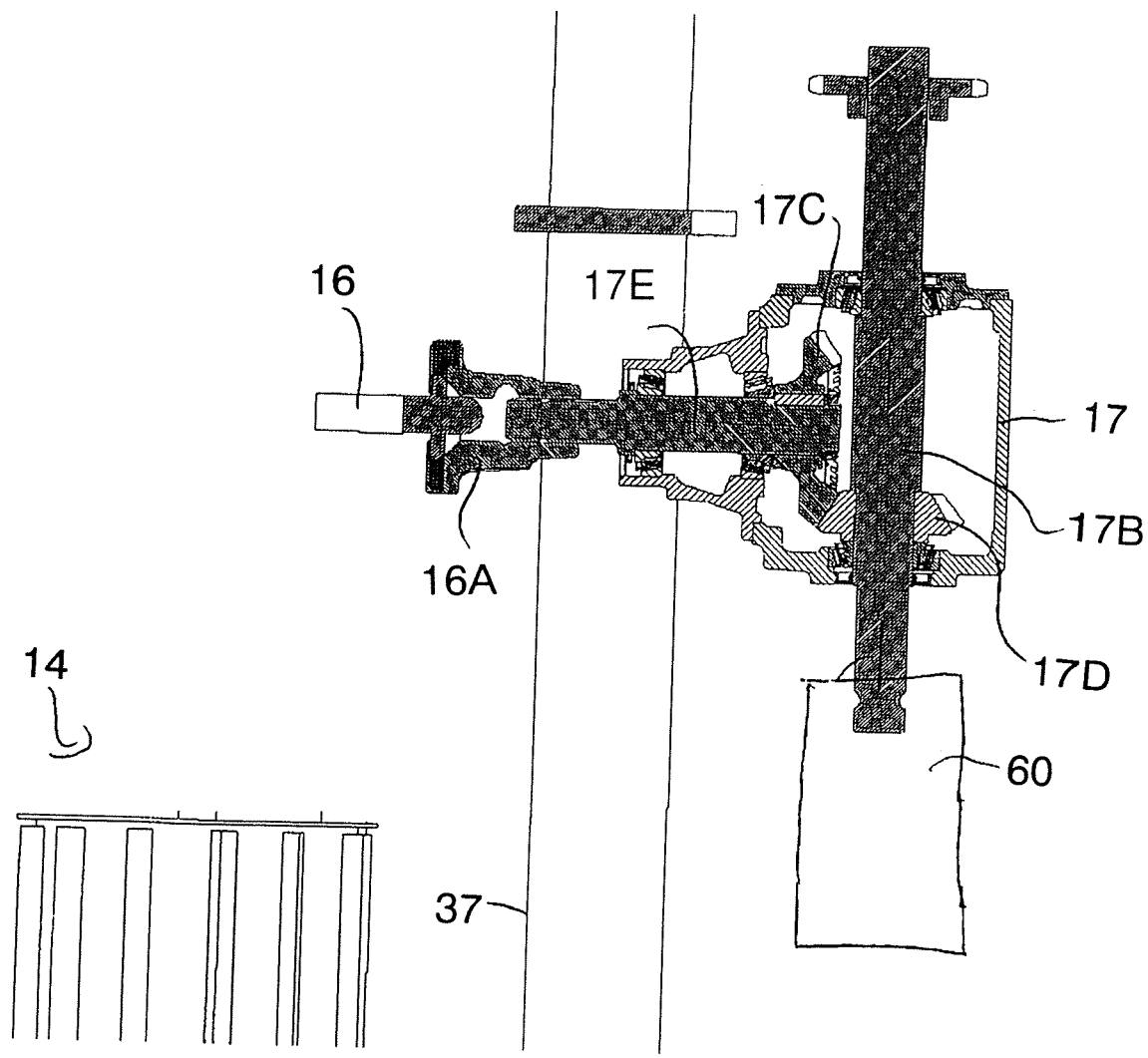
FIG. 3 is a cross-sectional view taken along line 3-3 in FIG. 1.
Figure 4:
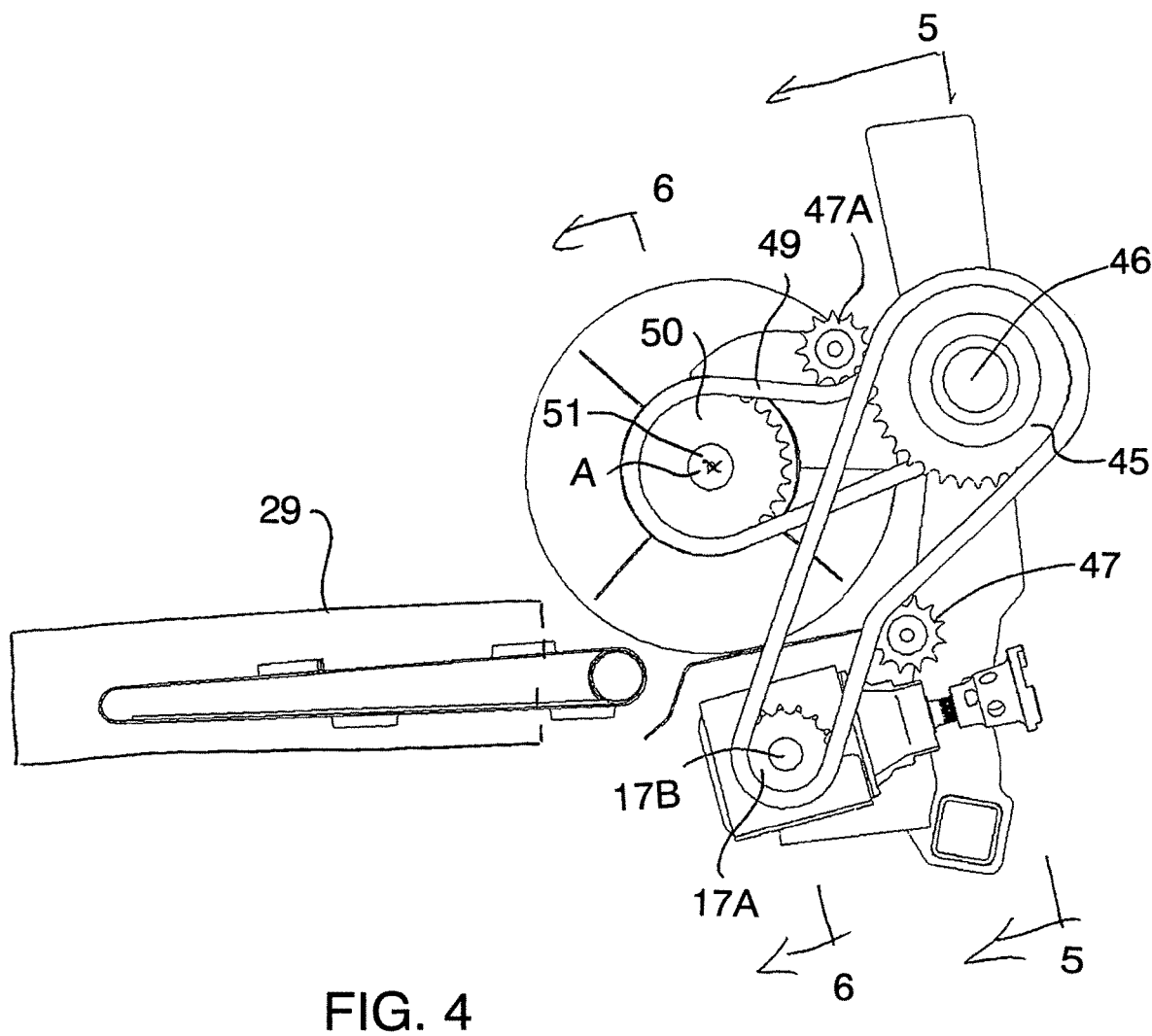
FIG. 4 is a schematic partial view taken along line 4-4 in FIG. 2.
Figure 5:
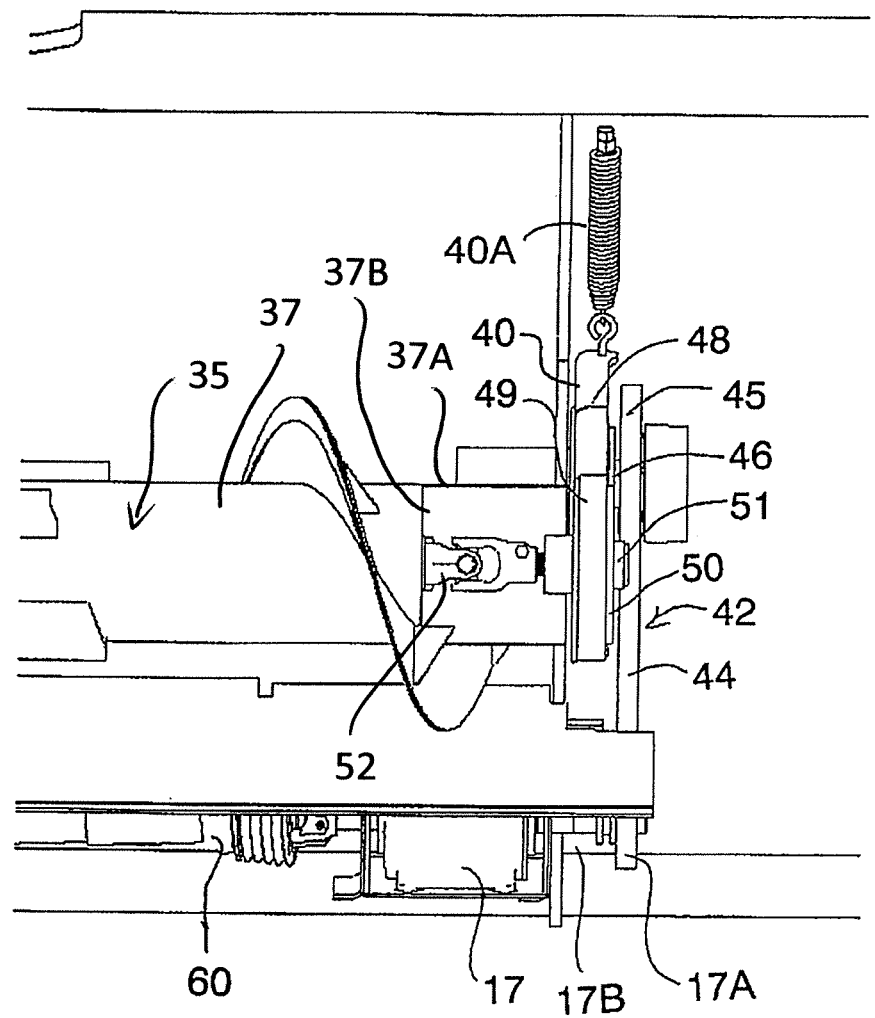
FIG. 5 is a cross-sectional view taken along line 5-5 in FIG. 4.
Figure 6:
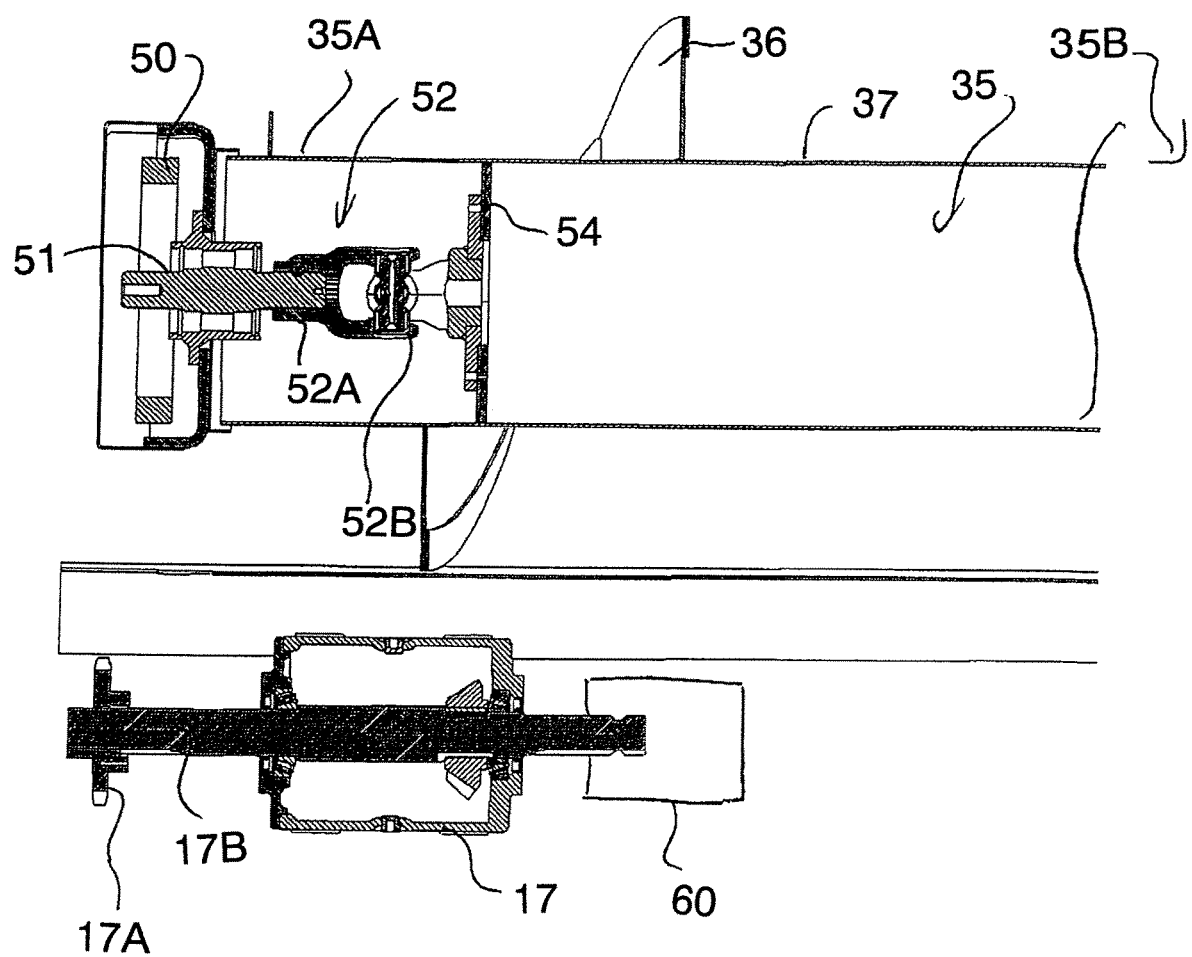
FIG. 6 is a cross-sectional view taken along line 6-6 in FIG. 4.

As shown in FIGS. 3, 5 and 6, the output shaft 17B is connected to a hydraulic pump 60 at the end of the shaft opposite the sprocket 17A to provide a hydraulic fluid drive to the drapers.

The universal joint 52 between the input drive shaft and 51 the adjacent end of the roller 35 acts to allow raising and lowering of that end relative to the other end. The universal joint 52 is located within an end portion 37A of the tube 37 of the roller 35 and is connected to a transverse plate 37B within the tube 37 of the roller.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A combination of a self-propelled harvesting machine and a harvesting header attached thereto, the combination comprising:
   a self-propelled harvesting machine having a feed opening at a forward end and a drive shaft at or adjacent the feed opening;
   the self-propelled harvesting machine being mounted on ground wheels moving the self-propelled harvesting machine in a forward travel direction during harvesting;
   and a harvesting header comprising:
   a header frame mounted on the self-propelled harvesting machine during harvesting and which is separable from the self-propelled harvesting machine;
   a discharge opening in the header frame which discharges into the feed opening of the self-propelled harvesting machine;
   an elongated cutter bar connected to the header frame along a front edge of the header frame;
   a draper assembly carrying the crop to the discharge opening;
   the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;
   a feed roller member mounted at the discharge opening driven in rotation in a direction to carry crop underneath the feed roller member through the discharge opening into the feed opening;
   and a drive transfer member receiving power from an output shaft of the self-propelled harvesting machine and driving at least the feed roller member;
   wherein the feed roller member is mounted at first and second ends thereof on first and second supports allowing independent up and down floating movement of the first and second ends of the feed roller member;
   wherein the drive transfer member comprises an input drive shaft connected to said first end of the feed roller member;
   wherein there is provided a universal coupling between the input drive shaft and said first end of the roller to allow raising and lowering of said first end relative to the second end; and
   wherein the drive transfer member comprises an output shaft generally parallel to the cutter bar and an idler shaft generally parallel to the output shaft and the input drive shaft, a first drive assembly located between the output shaft and the idler shaft and a second drive assembly between the idler shaft and the input drive shaft and wherein the first and second supports have a pivot axis coaxial with the idler shaft.

2. The combination according to claim 1 wherein the first and second supports comprise first and second pivot arms for pivotal movement about a transverse axis parallel to the cutter bar.

3. The combination according to claim 2 wherein the the first drive assembly includes a first chain and sprocket drive located between the output shaft and the idler shaft and the second drive assembly includes a second chain and sprocket drive between the idler shaft and the input drive shaft.

4. The combination according to claim 1 wherein the universal coupling is located within an end portion of the feed roller member and connected to a transverse plate within the feed roller member.

5. The combination according to claim 1 wherein the drive transfer member comprises a gearbox driven from said output shaft of the self-propelled harvesting machine and having an output drive shaft of the gear box generally parallel to the cutter bar.

6. The combination according to claim 5 wherein the gearbox is mounted at least partially within an imaginary downward projection of the feed roller member.

7. The combination according to claim 5 wherein the output drive shaft of the gear box also drives a hydraulic pump for at least driving the cutter and the drapers.

8. The combination according to claim 1 including a feed draper having a front guide roller located rearward of the cutter bar, a rear guide roller behind the front guide roller, and a draper canvas wrapped around the front and rear guide rollers to define a top run of the feed draper carrying the crop material rearwardly towards the discharge opening.

9. The combination according to claim 5 including a feed draper having a front guide roller located rearward of the cutter bar, a rear guide roller behind the front guide roller, and a draper canvas wrapped around the front and rear guide rollers to define a top run of the feed draper carrying the crop material rearwardly towards the discharge opening, wherein the gearbox is positioned behind the rear guide roller of the feed draper.

10. The combination according to claim 1 wherein the drive transfer member comprises a gearbox driven from said output shaft of the self-propelled harvesting machine and having an output drive shaft of the gear box generally parallel to the cutter bar.

11. The combination according to claim 10 wherein the gearbox is mounted at least partially within an imaginary downward projection of the feed roller member.

12. The combination according to claim 10 wherein the output drive shaft of the gear box also drives a hydraulic pump for at least driving the cutter and the drapers.

13. The combination according to claim 10 including a feed draper having a front guide roller located rearward of the cutter bar, a rear guide roller behind the front guide roller, and a draper canvas wrapped around the front and rear guide rollers to define a top run of the feed draper carrying the crop material rearwardly towards the discharge opening, wherein the gearbox is positioned behind the rear guide roller of the feed draper.

14. A combination of a self-propelled harvesting machine and a harvesting header attached thereto, the combination comprising:
 a self-propelled harvesting machine having a feed opening at a forward end and a drive shaft at or adjacent the feed opening;
 the self-propelled harvesting machine being mounted on ground wheels for moving the self-propelled harvesting machine in a forward travel direction during harvesting;
 and a harvesting header comprising:
 a header frame mounted on the self-propelled harvesting machine during harvesting and which is separable from the self-propelled harvesting machine;
 a discharge opening in the header frame which discharges into the feed opening of the self-propelled harvesting machine;
 an elongated cutter bar connected to the header frame along a front edge of the header frame;
 a draper assembly carrying the crop to the discharge opening;
 the draper assembly including first and second side drapers each on a respective side of the discharge opening with an outer guide roller at an opposite end of the header frame, an inner guide roller adjacent the discharge opening, and a draper canvas wrapped around the outer and inner guide rollers to define a top run of the respective side draper so as to carry the cut crop across the header to a discharge end adjacent the discharge opening;
 a feed roller member mounted at the discharge opening driven in rotation in a direction to carry crop underneath the feed roller member through the discharge opening into the feed opening;
 and a drive transfer member receiving power from an output shaft of the self-propelled harvesting machine and driving at least the feed roller member;
 wherein the feed roller member is mounted at first and second ends thereof on first and second supports allowing independent up and down floating movement of the first and second ends of the feed roller member;
 wherein the drive transfer member comprises an input drive shaft connected to said first end of the feed roller member;
 wherein there is provided a universal coupling between the input drive shaft and said first end of the feed roller member to allow raising and lowering of said first end relative to the second end; and
 wherein the drive transfer member comprises an output shaft generally parallel to the feed roller member and having an output end aligned in a plane generally perpendicular with the first end of the feed roller member and a drive assembly operatively coupled between the output shaft and input drive shaft and wherein the first and second supports have a pivot axis coaxial with the input drive shaft.

15. The combination according to claim 14 wherein the first and second supports comprise first and second pivot arms for pivotal movement about a transverse axis parallel to the cutter bar.

16. The combination according to claim 15 wherein the drive transfer member comprises an output shaft generally parallel to the cutter bar and an idler shaft generally parallel to the output shaft and the input drive shaft, and wherein the drive assembly includes a first drive assembly located between the output shaft and the idler shaft and a second drive assembly between the idler shaft and the input drive shaft, the first drive assembly includes a first chain and sprocket drive located between the output shaft and the idler shaft and the second drive assembly includes a second chain and sprocket drive between the idler shaft and the input drive shaft.

17. The combination according to claim 14 wherein the universal coupling is located within an end portion of the feed roller member and connected to a transverse plate within the feed roller member.

18. The combination according to claim 14 including a feed draper having a front guide roller located rearward of the cutter bar, a rear guide roller behind the front guide roller, and a draper canvas wrapped around the front and rear guide rollers to define a top run of the feed draper carrying the crop material rearwardly towards the discharge opening.

* * * * *